United States Patent [19]

Fujimoto

[11] Patent Number: 5,263,447
[45] Date of Patent: Nov. 23, 1993

[54] APPARATUS FOR CONTROLLING IDLING ROTATION OF ENGINE

[75] Inventor: Takanori Fujimoto, Hyogo, Japan

[73] Assignee: Mitsubishi Denki K.K., Tokyo, Japan

[21] Appl. No.: 31,922

[22] Filed: Mar. 16, 1993

Related U.S. Application Data

[63] Continuation of Ser. No. 815,902, Dec. 31, 1991, abandoned, which is a continuation of Ser. No. 552,030, Jul. 13, 1990, abandoned.

[30] Foreign Application Priority Data

Jul. 13, 1989 [JP] Japan .................. 1-180958

[51] Int. Cl.⁵ .................................. F02M 3/00
[52] U.S. Cl. ................................... 123/339
[58] Field of Search ............... 123/339, 349, 350, 585; 290/40 A, 40 R, 40 F, 40 C, 51

[56] References Cited

U.S. PATENT DOCUMENTS

| 4,700,674 | 10/1987 | Iwata | 123/585 |
|---|---|---|---|
| 4,794,898 | 1/1989 | Kato | 123/339 |
| 4,875,447 | 10/1989 | Kiuchi et al. | 123/339 |
| 4,877,003 | 10/1989 | Shimomura et al. | 123/339 |
| 4,877,273 | 10/1989 | Wazaki et al. | 290/40 C |
| 4,879,982 | 11/1989 | Itakura et al. | 123/339 |
| 4,883,034 | 11/1989 | Yashiki et al. | 123/339 |
| 4,898,005 | 2/1990 | Sakurai | 123/339 |
| 4,903,658 | 2/1990 | Miyama et al. | 123/339 |
| 4,903,659 | 2/1990 | Inagaki et al. | 123/339 |

FOREIGN PATENT DOCUMENTS

| 3830603A1 | 9/1988 | Fed. Rep. of Germany | 123/339 |
|---|---|---|---|
| 4007396A1 | 3/1990 | Fed. Rep. of Germany | 123/339 |
| 5855 | 1/1984 | Japan | 123/339 |

OTHER PUBLICATIONS

"Idle Rotation Frequency Control Device of Engine", Takanori Fujimoto, Mitsubishi Electric Corp., JPA 64-56612 dated Mar. 8, 1989.
"Idle Rotation Frequency Control Device of Engine", Hiroyasu Shiichi, Mitsubishi Electric Corp., JPA 64-56613 dated Mar. 8, 1989.
U.S. patent application Ser. No. 07/490,205, filed Mar. 8, 1990.

Primary Examiner—Raymond A. Nelli
Attorney, Agent, or Firm—Sughrue, Mion, Zinn, Macpeak & Seas

[57] ABSTRACT

An apparatus for controlling the idling rotation of an engine comprises a generator driven by the engine for charging a battery for supplying DC power to electrical loads, a switching circuit for controlling an exciting current flowing through a field coil of the generator to keep the voltage of the battery substantially constant, and a control circuit for controlling an amount of suction air sucked into the engine. The control circuit includes a detection circuit for detecting a total excitation period $C_{pr}$ of the field coil in every predetermined crank angle cycle and a computer for computing a correction amount $P_E$ of air sucked in the engine in response to the detected total excitation period $C_{pr}$.

7 Claims, 5 Drawing Sheets

CRANK ANGLE SIGNAL

EXCITATION SIGNAL

CRANK ANGLE SIGNAL

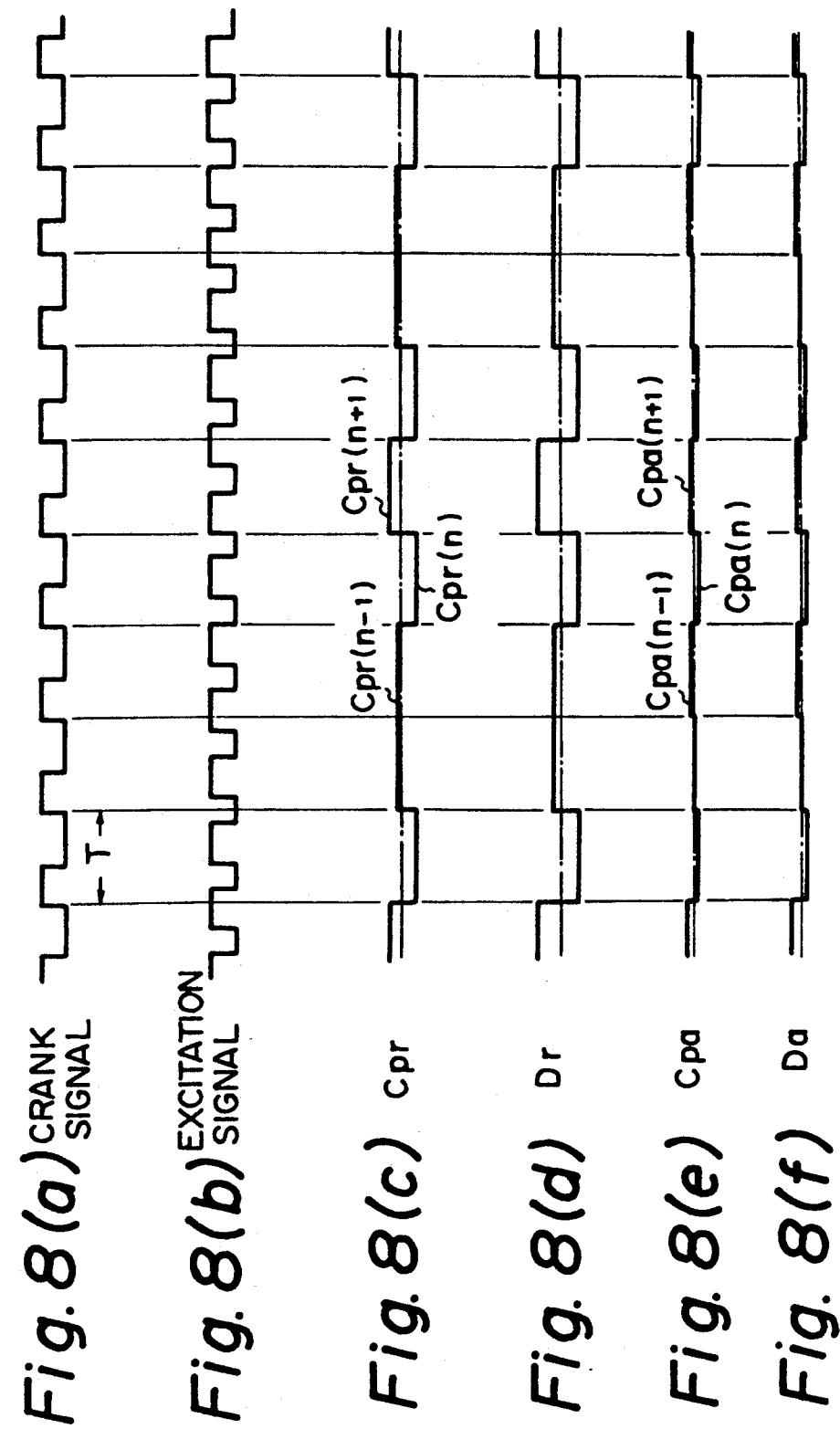

APPARATUS FOR CONTROLLING IDLING ROTATION OF ENGINE

This is a continuation of application Ser. No. 07/815,902 filed Dec. 31, 1991 which is a continuation of application Ser. No. 07/552,030 filed on Jul. 13, 1990, both of which are now abandoned.

BACKGROUND OF THE INVENTION

1. Field of the Invention

This invention relates to an apparatus for controlling the idling rotation of an engine, and more particularly for correcting the amount of air to be supplied to an engine in response to a total amount of electrical loads.

2. Prior Art

In a conventional apparatus for controlling the idling rotation of an engine, control is effected by the amount of air supplied to the engine in response to a deviation in a real number of revolutions thereof from an intended number of idling revolutions to maintain rotation of the engine at the intended level.

With such a conventional apparatus, however, if high-power fitments consuming high levels of electricity, such as head lamps, radiator fan, etc. are simultaneously activated the operation of a generator for supplying power to fitments results in an increase in the engine load and a decrease in the engine rotation. Such a decrease in engine rotation will in due course be recovered by the operation of the above-mentioned control, but the control response is so slow as to cause the engine to stall.

It is proposed in Japanese Patent Public Disclosure No. 197449/83, for example, that ON/OFF states of a plurality of switches correspondingly provided for such electrical loads are detected to adjust the amount of suction air. In this prior art, it is necessary to additionally incorporate the corresponding number of switches and input circuits to that of possible electrical loads, and therefore the control apparatus is made complicated.

SUMMARY OF THE INVENTION

The present invention has been made to solve such problems as described above, and it is an object of the invention to provide an apparatus for controlling the idling rotation of an engine which is simple in structure and capable of preventing a delay in the control response and thus an engine from stalling.

According to the present invention, such an object can be attained by an apparatus for controlling the idling rotation of an engine comprising means for detecting an excitation period $C_{pr(n)}$ [n: any integer] which represents a total time excitation period of a field coil of a generator in an n-th cycle of a predetermined crank angle period of the engine, means for computing a career average excitation period $C_{apr(n)}$ in the n-th cycle according to the following equation:

$$C_{apr(n)} = K \cdot C_{apr(n-1)} + (1-K)C_{pr(n)}$$

where K is a filter constant, and means for correcting the amount of air to be sucked into the engine in accordance with the value of the obtained average excitation period $C_{apr(n)}$.

BRIEF DESCRIPTION OF THE DRAWINGS

FIGS. 8(a) through (f) are time charts showing the operation of the CPU.

DETAILED DESCRIPTION OF A PREFERRED EMBODIMENT

Figure 1:
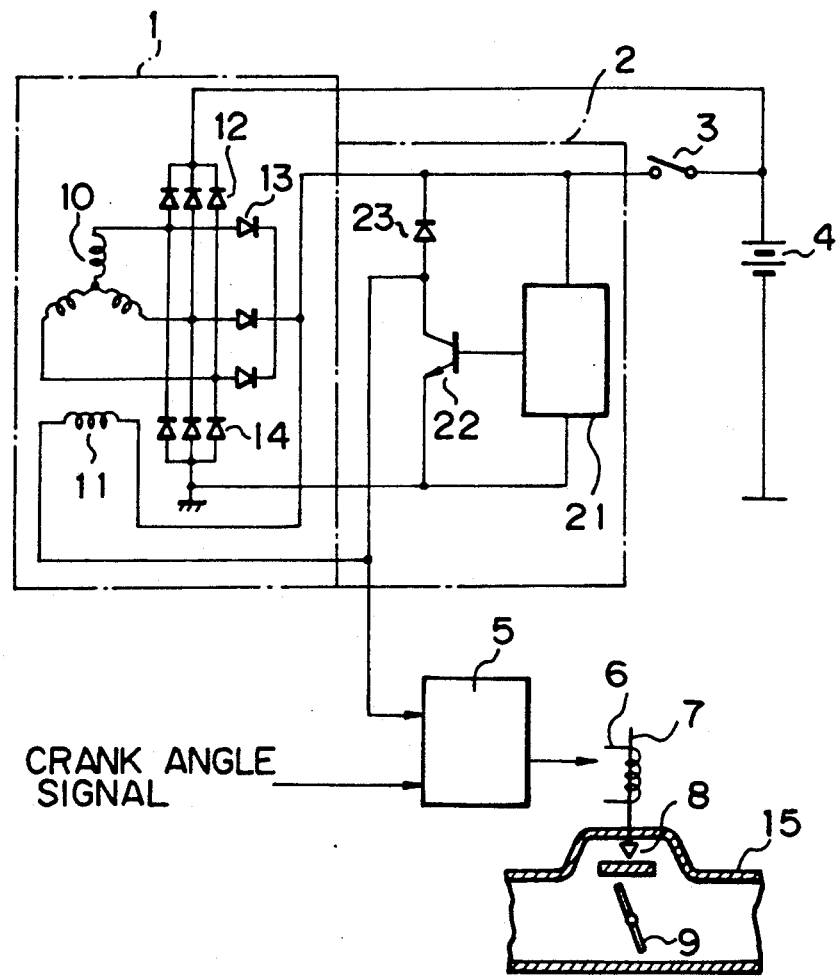
FIG. 1 is a diagram illustrating an embodiment of this invention.

An embodiment of the invention will now be described with reference to the drawings. FIG. 1 shows an embodiment of an apparatus for controlling the idling rotation of an engine comprises a generator 1, a switching circuit 2 for controlling the exciting current for a field winding 11 of the generator 1, an engine switch 3 and a DC battery 4 mounted on the vehicle. The generator 1 is arranged by γ-connected armature windings 10 and diodes 12-14 for commutating the three-phase AC outputs of the armature windings 10. The switching circuit 2 is arranged by a voltage detecting circuit 21, a semiconductor switching element 22 such as a transistor and a diode 23, the voltage detection circuit 21 serving to detect the voltage of the battery 4, the semiconductor switching element 22 being connected in series to the field coil 11 and turned to its conductive state by the output of the voltage detecting circuit 21 when the voltage of the battery 4 drops below a predetermined value, and the diode 23 serving to divert the flow of exciting current through the field coil 11 when the semiconductor switching element 22 is turned off.

The generator 1 is driven by the engine to charge the battery 4. The switching circuit 2 controls the excitation current for the field coil 11 so that the generated voltage from the generator 1 or the voltage of the battery 4 charged by the generator 11, substantially attains a predetermined constant value. This operation for keeping the charge voltage substantially constant is similar to that of the prior art.

In this apparatus according to the invention, there is also provided a control unit 5 for receiving, as inputs, an on/off signal obtained at a junction between the field coil 11 and the semiconductor switching element 22 (the on/off signal being hereinunder referred to as an exciting signal) and a crank angle signal generated in synchronism with a predetermined crank angle of the engine to detect a total excitation period of the field coil 11, or a total on-period of the semiconductor switching element 22 during each of predetermined crank angle cycles of the engine, thereby computing the regulation amount of air sucked into the engine in response to the detected on-period. There is further provided a solenoid 6 operable to control the opening and closing operation of an electromagnetic valve 7 in accordance with the output of the control unit 5, and the opening and closing operation of the electromagnetic valve 7 achieves the opening and closing of a by-pass passage 8 additionally provided to the main suction passage 15 incorporating a throttle valve 9.

Figure 2:
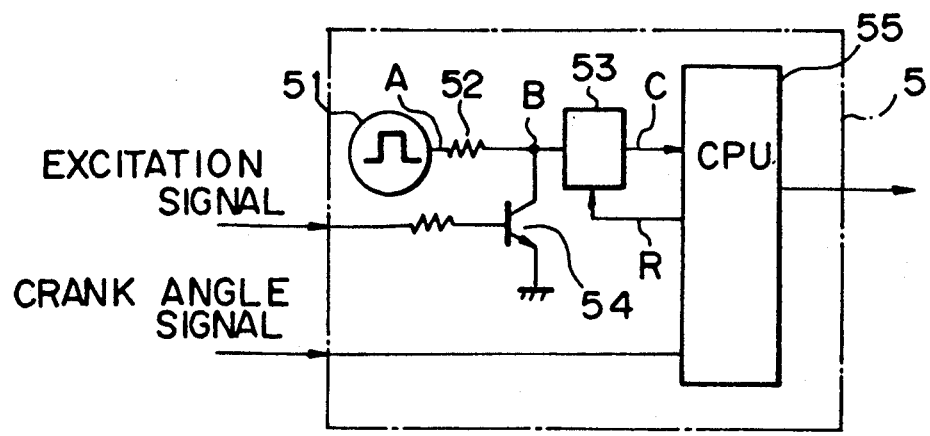
FIG. 2 is a circuit diagram showing a control unit illustrated in FIG. 1.

FIG. 2 shows a detailed arrangement of the control unit 5, wherein numeral 51 denotes a clock generator, 53 a counter, 54 a switching transistor and 55 a microprocessor (CPU).

The operation of the control unit 5 shown in FIGS. 1 and 2 will now be explained by referring to FIGS. 3(a) through (f).

Figure 3:
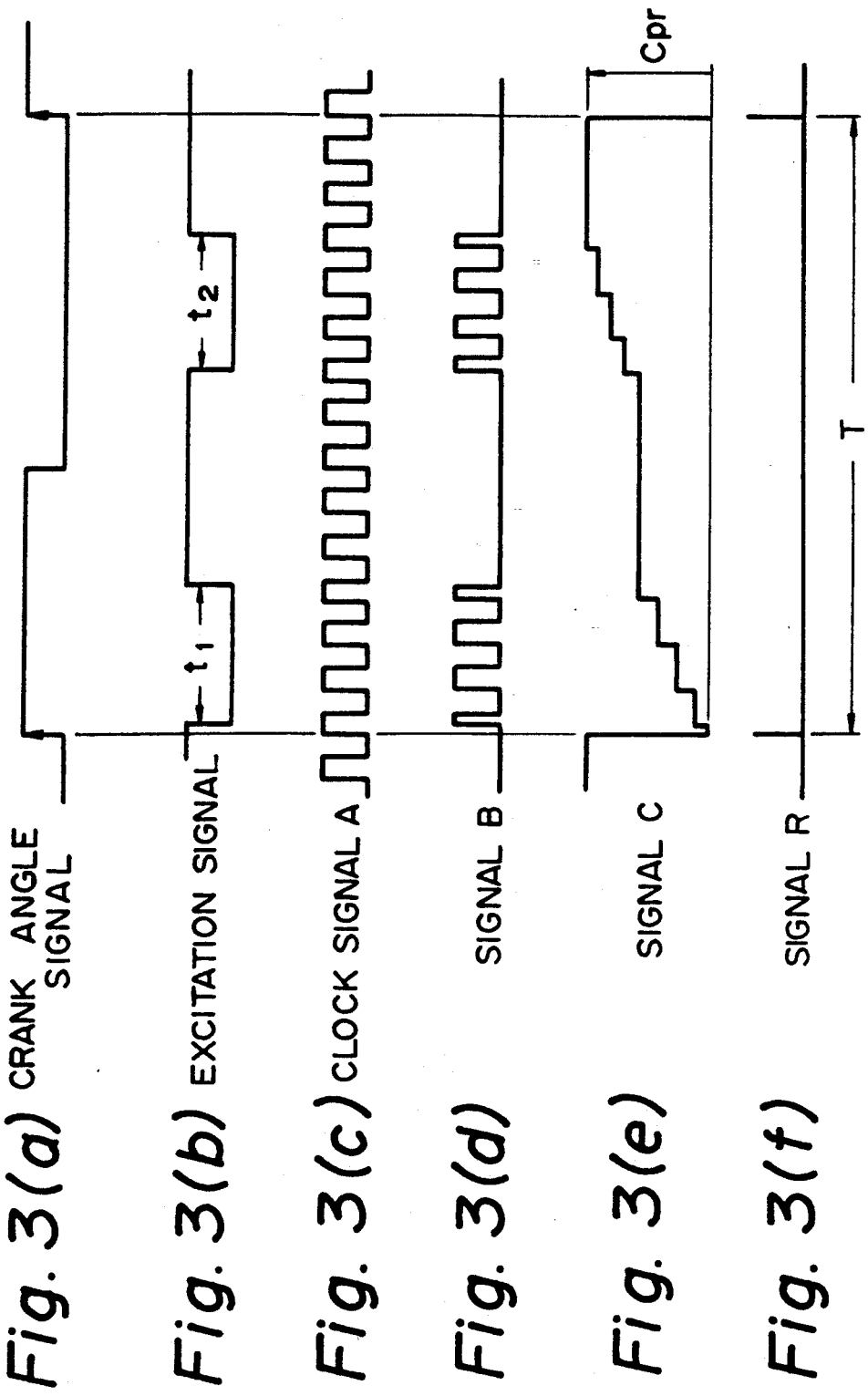
FIGS. 3(a) through (f) show wave forms at portions in the control unit shown in FIG. 2.

The clock generator 51 outputs a clock signal A having a predetermined high frequency as shown in FIG. 3(c). The switching transistor 54 is made conductive when the excitation signal shown in FIG. 3(b) is a high level, namely the semiconductor switching element 22 of the switching circuit 2 is non-conductive and, therefore, no excitation current flows therethrough. Accordingly, as shown in FIG. 3(d), the clock signal A is shunted by the transistor 54 and is not transmitted to the counter 53, during the non-conductive, or non-excitation period of the excitation signal, as shown in FIG. 3(d). In other words, only when the excitation current flows through the excitation coil 11 and the switching element 22, the clock signal A is input to the counter 53 through a resistor 52, as a signal B.

The counter 53 counts the signal B and delivers a count value signal C, as shown in FIG. 3(e), to the CPU 55. The CPU 55 reads the count value at every cycle of the crank angle signal shown in FIG. 3(a), for example at every input timing of a rising edge of the crank angle signal, and outputs an initializing signal R shown in FIG. 3(f) to the counter 53. The count value $C_{pr}$ read into CPU 55 at the reading timing represents a value corresponding to the total excitation time period in each cycle of the crank angle signal A, and is renewedly stored in a suitable memory in the CPU. It is obviously understood that the count value $C_{pr}$ corresponds to the total time value $t_1+t_2$, where $t_1$ and $t_2$ are excitation time periods of the excitation coil 11 in a cycle of the crank angle signal as shown in FIG. 3(b).

The CPU 55 computes the regulation value of suction air on the basis of the read count value $C_{pr}$ and the crank angle signal A. The operation of such a computation will be described with reference to FIGS. 4 through 8.

Figure 4:
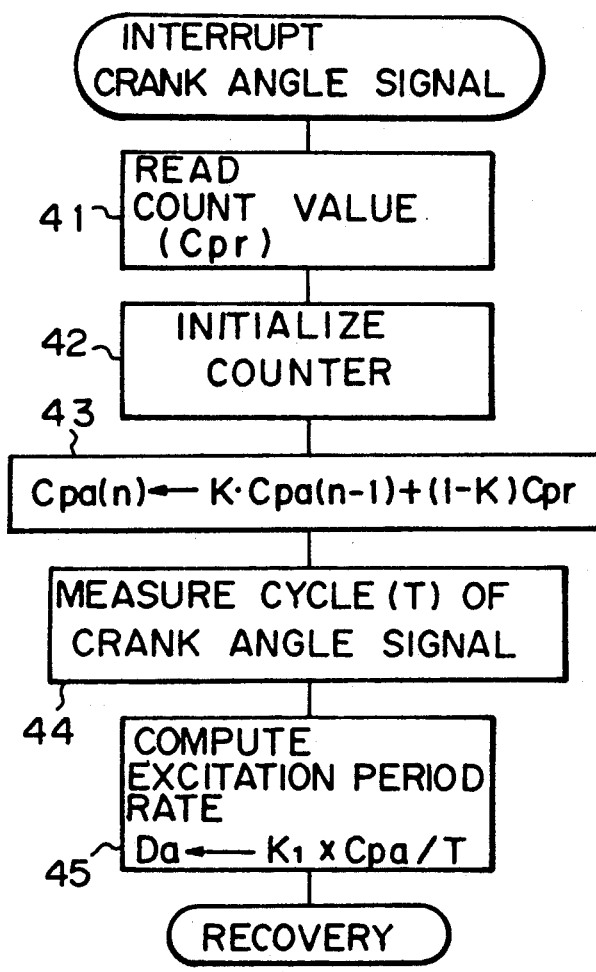
FIGS. 4 and 5 are flow charts showing the operation of a CPU incorporated in the control unit shown in FIG. 2.
Figure 5:
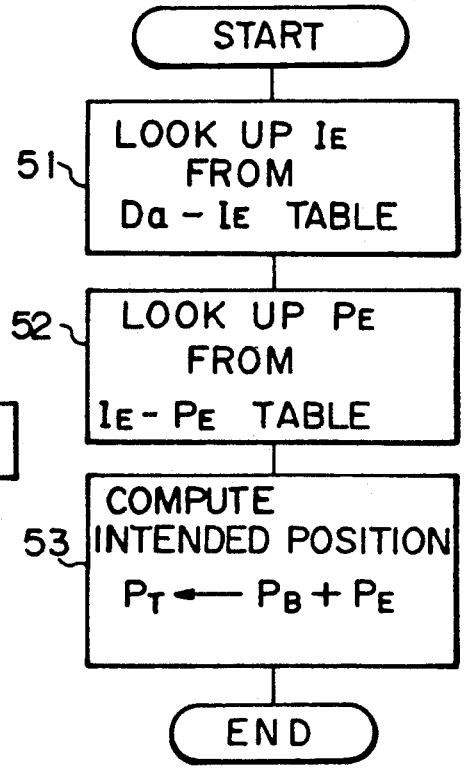

FIGS. 4 and 5 are flow charts showing the computing procedure of the above-mentioned regulation amount. The flow shown in FIG. 5 is executed in accordance with a control program stored in the CPU 55, and during execution of the control program when the crank angle signal A is provided to the CPU, the flow shown in FIG. 5 is interrupted and the crank angle signal interruption routine shown in FIG. 4 is executed.

In the interruption routine, at step 41, the count value $C_{pr}$ is read into the CPU whenever the rising edge of the crank angle signal is detected, and at step 42 the initialization of the counter 53 (in FIG. 2) is performed. Thus, the count value $C_{pr}$ read and stored in CPU 55 is renewed at every cycle of the predetermined crank angle and varied as shown in FIG. 8(c). At step 43, the computation of the following equation is performed:

$$C_{pa(n)}=K \cdot C_{pa(n-1)}+(1-K)C_{pr(n)}$$

where, $C_{pa(n-1)}$ and $C_{pa(n)}$ are average excitation periods for the (n-1)-th and n-th cycle of the crank angle signal, $C_{pr(n)}$ is the count value read at the n-th cycle of the crank angle signal, and K is a filter constant with a value of less than 1. $C_{pa}$ ($=\{C_{pa(n)}\}$) is shown in FIG. 8(e). At step 44, the crank angle cycle T is measured, and at step 45, an excitation period rate $D_a$ for the crank angle signal cycle T is determined in accordance with the following equation:

$$D_a=K_1 \times C_{pa}/T$$

where, $K_1$ is a conversion coefficient for converting the excitation period rate to a predetermined resolution. $D_a$ is illustrated in FIG. 8(f).

$D_r$ shown in FIG. 8(d) means a rate proportional to $C_{pr}/T$.

In such a manner as described above, the crank angle signal interruption routine is completed.

Figure 6:
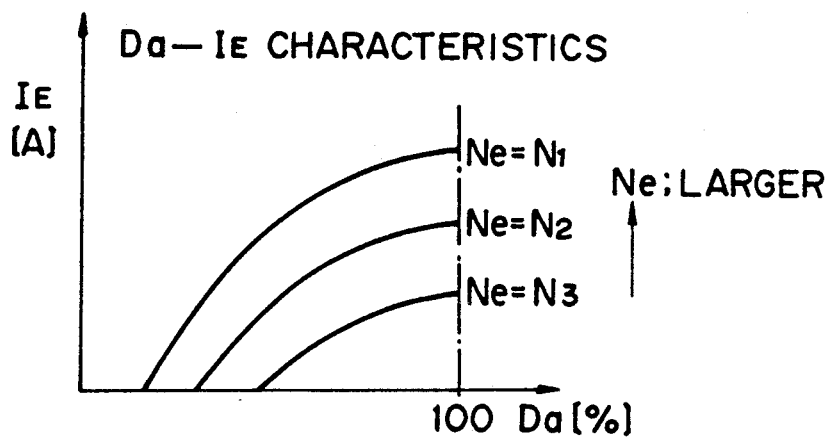
FIGS. 6 and 7 show characteristics of look-up tables stored in the CPU of the control unit.
Figure 7:
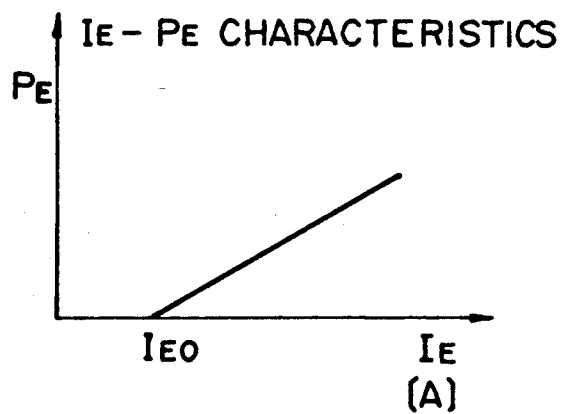

A correction amount $P_E$ corresponding to the excitation period rate $D_a$ will now be determined on the basis thereof using the same procedure as shown in FIG. 5. At step 51, $I_E$ is retrieved from a $D_a$-$I_E$ look-up table storing the interrelationships between the excitation period rate $D_a$ and $I_E$ as shown in FIG. 6, where $I_E$ is a value of an output current of the generator 1. The reason why the $D_a$-$I_E$ relationship varies with the number Ne of engine revolutions as a parameter is that $D_a$ corresponds to the exciting current of the field coil 11 and $I_E$ is the output current of the generator 1. Thus, the output of the generator 1 is given by the magnitude of the exciting current and the number of the engine revolutions. Subsequently, at step 52, the correction amount $P_E$ corresponding to $I_E$ is retrieved from an $I_E$-$P_E$ look-up table storing the relationships between the generator output current $I_E$ and the correction amount $P_E$ as shown in FIG. 7. The correction data $P_E$ stored in the $I_E$-$P_E$ table is set at zero at a point of the generator output $I_{EO}$ when no electrical load is activated and increases as an increment of the $I_E$ value, or the activated electric load value, as shown in FIG. 7. At step 53, the correction amount $P_E$ obtained at step 52 is added to the basic control amount $P_B$ to obtain a final control amount $P_T$ for controlling the amount of the suction air. Thus, the amount of suction air is increased in response to the correction amount $P_E$.

The operation of detecting the total excitation period at every predetermined period, or fixed crank angle period, has been described. However, in a higher engine rotation state, the detected amount of the excitation period $C_{pr}$ will be largely varied and may include error factors because the detection time period is shortened as the rotation increases, and accordingly the rate $D_a$ may also include error factors. In such a case, it will be possible to reduce such a variation of the detected amount of the excitation period by changing the predetermined crank angle period in response to the engine rotation. Thus, a highly responsive and highly precise detected amount throughout the entire range of the engine rotation can be provided by changing the predetermined crank angle period depending on the engine rotation.

As described above, with the present invention the excitation period of the switching means for controlling the field current of the generator is detected and the amount of suction air supplied to the engine is corrected by the correction amount determined on the basis of the excitation period, so that the variation in the engine load relative to an increase in the electric load can be precisely detected and thus any decrease in the engine rotation or engine stall due to a delayed control response can be prevented and a simple structure can be provided. The phase of output of the generator is in synchronism with the phase of the engine rotation so that the correction amount can be determined on the basis of the excitation period at every predetermined cranking period to stably provide a highly precise detection amount. Furthermore, the operation of averaging the detected excitation periods is performed to allow the variation in the excitation period detection amount to be restrained and the correction of the suction air amount to be stable.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for controlling the idling rotation of an engine comprising:
   a generator driven by the engine for charging a battery;
   a switching means for controlling an exciting current flowing through a field coil of said generator to keep the voltage generated from said generator and the voltage of said battery substantially constant;
   means for detecting a total excitation period $C_{pr}$ of said field coil in every predetermined crank angle cycle;
   means for computing a correction amount $P_E$ of suction air sucked into said engine in response to said detected total excitation period $C_{pr}$; and
   means for controlling the amount of suction air in response to said computed correction amount $P_E$ of suction air;
   wherein said detecting means serves to count and measure the excitation period using a clock generator.

2. An apparatus for controlling the idling rotation of an engine comprising:
   a generator driven by the engine for charging a battery;
   a switching means for controlling an exciting current flowing through a field coil of said generator to keep the voltage generated from said generator and the voltage of said battery substantially constant;
   means for detecting a total excitation period $C_{pr}$ of said field coil in every predetermined crank angle cycle;
   means for computing a correction amount $P_E$ of suction air sucked into said engine in response to said detected total excitation period $C_{pr}$; and
   means for controlling the amount of suction air in response to said computed correction amount $P_E$ of suction air;
   wherein said detecting means comprises:
   a clock generator for generating a clock signal;
   a switching transistor connected to receive an output of said switching means at a base terminal thereof so that said transistor is controlled to be conductive when no exciting current flows through said field coil;
   a counter initialized for every crank angle cycle for counting said clock signal only when said switching transistor is non-conductive and for outputting a count value representing said total excitation period $C_{pr}$ every crank angle cycle to said computing means.

3. An apparatus for controlling the idling rotation of an engine comprising:
   a generator driven by the engine for charging a battery;
   a switching means for controlling an exciting current flowing through a field coil of said generator to keep the voltage generated from said generator and the voltage of said battery substantially constant;
   means for detecting a total excitation period $C_{pr}$ of said field coil in every predetermined crank angle cycle;
   means for computing a correction amount $P_E$ of suction air sucked into said engine in response to said detected total excitation period $C_{pr}$; and
   means for controlling the amount of suction air in response to said computed correction amount $P_E$ of suction air;
   wherein said computing means executes a calculation of an average excitation period $C_{pa(n)}$ (n: any integer) corresponding to an n-th cycle of said crank angle cycles according to the following equation:

$$C_{pa(n)} = K \cdot C_{pa(n-1)} + (1-K) C_{pr(n)}$$

where K is a filter constant and less than 1, and $C_{pr(n)}$ is a total excitation period in said n-th crank angle cycle, and computes said correction amount $P_E$ of the suction air in accordance with said average excitation period $C_{pa(n)}$.

4. An apparatus according to claim 3, wherein said computing means further executes a calculation of an excitation period rate $D_{pa(n)}$ according to the following equation:

$$D_{pa(n)} = K_1 \cdot C_{pa(n)} / T$$

where T is a value of each of said crank angle cycles and $K_1$ is a resolution conversion coefficient, and computes said correction amount $P_E$ of the suction air in accordance with said excitation period rate $D_{pa(n)}$.

5. An apparatus according to claim 4, wherein said computing means further include a $D_{pa}$-$I_E$ predetermined look-up table and an $I_E$-$P_E$ predetermined look-up table and output said correction amount $P_E$ by looking up said tables, where $I_E$ is an output current of said generator.

6. An apparatus for controlling an idling rotation of an engine which is adapted to drive a generator having a field coil for charging a battery, said apparatus comprising:
   producing means for producing an output representing a first state when an exciting current flows through said field coil and for producing an output representing a second state which is different from the first state when the exciting current stops flowing through said field coil to maintain a voltage generated from said generator and a voltage of said battery substantially constant;
   detecting means, responsive to the output of said producing means, for detecting a total excitation period of said field coil in every predetermined crank angle cycle;
   computing means for computing a correction amount of air sucked into said engine in response to the detected excitation period; and
   controlling means for controlling an amount of sucked air in response to the computed correction amount;
   wherein said detecting means serves to count and measure the excitation period using a clock generator.

7. An apparatus for controlling an idling rotation of an engine which is adapted to drive a generator having a field coil for charging a battery, said apparatus comprising:

producing means for producing an output representing a first state when an exciting current flows through said field coil and an output representing a second state which is different from the first state when the exciting current stops flowing through said field coil to maintain a voltage generated from said generator and a voltage of said battery substantially constant;

detecting means, responsive to the outputs of said producing means, for detecting a total excitation period of said field coil in every predetermined crank angle cycle;

averaging means, responsive to said detecting means, for averaging the detected excitation period;

computing means for computing a correction amount of air sucked into said engine in response to the output of said averaging means; and controlling means for controlling an amount of sucked air in response to the computed correction amount;

wherein said detecting means serves to count and measure the excitation period using a clock generator.

* * * * *